United States Patent
Ohno et al.

(10) Patent No.: US 10,434,754 B2
(45) Date of Patent: Oct. 8, 2019

(54) HEAT-SHRINKABLE MULTI-LAYER FILM

(71) Applicant: GUNZE LIMITED, Ayabe-shi, Kyoto (JP)

(72) Inventors: Naoki Ohno, Shiga (JP); Tadayoshi Tanaka, Shiga (JP)

(73) Assignee: GUNZE LIMITED, Kyoto (JP)

( * ) Notice: Subject to any disclaimer, the term of this patent is extended or adjusted under 35 U.S.C. 154(b) by 51 days.

(21) Appl. No.: 15/747,566

(22) PCT Filed: Sep. 27, 2016

(86) PCT No.: PCT/JP2016/078481
§ 371 (c)(1),
(2) Date: Jan. 25, 2018

(87) PCT Pub. No.: WO2017/061308
PCT Pub. Date: Apr. 13, 2017

(65) Prior Publication Data
US 2018/0215128 A1 Aug. 2, 2018

(30) Foreign Application Priority Data

Oct. 5, 2015 (JP) .................................. 2015-197420

(51) Int. Cl.
| | | |
|---|---|---|
| B32B 27/08 | (2006.01) | |
| B32B 27/32 | (2006.01) | |
| B65D 23/08 | (2006.01) | |
| G09F 3/04 | (2006.01) | |
| B29C 48/08 | (2019.01) | |
| B29C 48/21 | (2019.01) | |
| B29K 23/00 | (2006.01) | |
| G09F 3/02 | (2006.01) | |

(52) U.S. Cl.
CPC .............. B32B 27/08 (2013.01); B32B 27/32 (2013.01); B32B 27/325 (2013.01); B65D 23/08 (2013.01); B65D 23/0878 (2013.01); G09F 3/04 (2013.01); *B29C 48/08* (2019.02); *B29C 48/21* (2019.02); *B29K 2023/0625* (2013.01); *B29K 2023/12* (2013.01); *B29K 2023/38* (2013.01); *B29K 2995/0012* (2013.01); *B29K 2995/0063* (2013.01); *B29K 2995/0077* (2013.01); *B32B 2250/03* (2013.01); *B32B 2250/24* (2013.01); *B32B 2250/40* (2013.01); *B32B 2264/025* (2013.01); *B32B 2264/0235* (2013.01); *B32B 2264/0292* (2013.01); *B32B 2270/00* (2013.01); *B32B 2274/00* (2013.01); *B32B 2307/30* (2013.01); *B32B 2307/412* (2013.01); *B32B 2307/54* (2013.01); *B32B 2307/72* (2013.01); *B32B 2307/736* (2013.01); *B32B 2307/746* (2013.01); *B32B 2307/75* (2013.01); *B32B 2519/00* (2013.01); *G09F 2003/0257* (2013.01)

(58) Field of Classification Search
CPC ... B32B 27/08; B32B 27/325; B32B 2250/40; B32B 2307/30; B32B 2307/54; B32B 2307/72; B32B 2250/03; B65D 23/0878; G09F 3/04; B29C 47/0021
USPC ........................................................ 428/516
See application file for complete search history.

(56) References Cited

U.S. PATENT DOCUMENTS

| | | | | |
|---|---|---|---|---|
| 2008/0050651 | A1* | 2/2008 | Wakai .................. | B29C 61/003 429/185 |
| 2015/0273803 | A1 | 10/2015 | Maruichi et al. | |

FOREIGN PATENT DOCUMENTS

| | | |
|---|---|---|
| EP | 2 799 230 | 11/2014 |
| JP | 9-001751 | 1/1997 |
| JP | 2001-341250 | 12/2001 |
| JP | 2006-281584 | 10/2006 |
| JP | 2007-253349 | 10/2007 |
| JP | 2008-173962 | 7/2008 |
| JP | 2008-174728 | 7/2008 |
| WO | 2014/080777 | 5/2014 |

* cited by examiner

*Primary Examiner* — Hui H Chin
(74) *Attorney, Agent, or Firm* — Hamre, Schumann, Mueller & Larson, P.C.

(57) ABSTRACT

The present invention provides a heat shrinkable multilayer film that has low density, excellent shrinkage properties, and high rigidity, is less likely to suffer delamination, and also has excellent transparency. The present invention relates to a heat shrinkable multilayer film, containing: front and back layers; and an interlayer, the front and back layers each containing 60 to 80% by weight of a cyclic olefin resin and 20 to 40% by weight of an ethylene resin, the interlayer containing 50 to 80% by weight of an olefin resin and 20 to 50% by weight of a plastic resin, the interlayer containing 35 to 70 mol % of a propylene component, 1 to 10 mol % of an ethylene component, and 1 to 10 mol % of a butene component, based on 100 mol % of resin components constituting the interlayer.

4 Claims, No Drawings

HEAT-SHRINKABLE MULTI-LAYER FILM

TECHNICAL FIELD

The present invention relates to a heat shrinkable multilayer film that has low density, excellent shrinkage properties, and high rigidity, is less likely to suffer delamination, and also has excellent transparency. The present invention also relates to a heat shrinkable label containing the heat shrinkable multilayer film.

BACKGROUND ART

Many containers, such as plastic bottles and metal cans, have heat shrinkable labels attached to them these days. Such heat shrinkable labels are prepared by printing images on a heat shrinkable multilayer film made of a thermoplastic resin.

Heat shrinkable multilayer films are required to have various properties including heat resistance, solvent resistance, and tearing properties along the perforation, as well as low-temperature shrinkability.

Materials used for heat shrinkable labels include polystyrene, polyester, and polyolefin.

More and more used plastic bottles collected for recycling are being reprocessed into flakes or pellets. Heat shrinkable labels are perforated in advance to make it easy for consumers to dispose of plastic bottles and heat shrinkable labels separately. Still, many plastic bottles are disposed of with the heat shrinkable labels on.

In such a case, collected plastic bottles are ground into a size of about several millimeters square to 10 mm square. Ground pieces of heat shrinkable labels having a density of lower than 1,000 $kg/m^3$ and caps are removed by a gravity separator, and ground pieces of heat shrinkable labels having a density of 1,000 $kg/m^3$ or higher are removed with an air separator. Desired recycled plastic flakes and recycled plastic pellets are obtained from these ground pieces of plastic bottles cleared of impurities.

The gravity separator is a device that puts the ground pieces in water to separate them into those that float on water (e.g., ground pieces of heat shrinkable labels having a density of lower than 1,000 $kg/m^3$ and caps) and those that sink in water (ground pieces of heat shrinkable labels having density of 1,000 $kg/m^3$ or higher and ground pieces of plastic bottles). The air separator is a device that scatters the ground pieces and provides air from below to blow away ground pieces of heat shrinkable labels. Because of their principles, the gravity separator has high processability per unit time and the air separator has low processability. Thus, a heat shrinkable label having a density of lower than 1,000 $kg/m^3$, which is removable with a gravity separator, is demanded.

Unfortunately, heat shrinkable labels formed from polystyrene or polyester have a density of higher than 1,000 $kg/m^3$, so that they cannot be separated with a gravity separator in the recycling process.

Patent Literature 1 discloses a heat shrinkable label that has an interlayer containing a cyclic olefin resin. Such heat shrinkable labels formed from polyolefin have a density of lower than 1,000 $kg/m^3$, but have low heat shrinkage. They thus do not shrink sufficiently when attached to a container such as a plastic bottle, leading to poor finished quality. In addition, heat shrinkable labels formed from polyolefin have low rigidity. They are thus less suitable for automatic attachment machines and tend to cause problems such as label jam.

In view of the situation, there is a demand for a heat shrinkable label that has excellent shrinkability and rigidity while achieving low density.

CITATION LIST

Patent Literature

Patent Literature 1: WO 2014/080777

SUMMARY OF INVENTION

Technical Problem

In view of the above problems, the present invention aims to provide a heat shrinkable multilayer film that has low density, excellent shrinkage properties, and high rigidity, is less likely to suffer delamination, and also has excellent transparency. The present invention also aims to provide a heat shrinkable label containing the heat shrinkable multilayer film.

Solution to Problem

The present invention is directed to a heat shrinkable multilayer film containing front and back layers; and an interlayer, the front and back layers each containing 60 to 80% by weight of a cyclic olefin resin and 20 to 40% by weight of an ethylene resin, the interlayer containing 50 to 80% by weight of an olefin resin and 20 to 50% by weight of a plastic resin, the interlayer containing 35 to 70 mol % of a propylene component, 1 to 10 mol % of an ethylene component, and 1 to 10 mol % of a butene component, based on 100 mol % of the total of resin components constituting the interlayer.

The present invention will be described in detail below.

The present inventors found out that a heat shrinkable multilayer film achieves low density while exhibiting excellent shrinkage properties and high rigidity when a resin constituting its interlayer contains a propylene component, an ethylene component, and a butene component at a predetermined ratio. The inventors further found out that such a heat shrinkable multilayer film can suppress delamination and improve transparency. They thus completed the present invention.

The heat shrinkable multilayer film of the present invention contains front and back layers and an interlayer.

The "front and back layers" as used herein means both a front layer and a back layer.

The front and back layers each preferably contain a cyclic olefin resin.

When the front and back layers contain the cyclic olefin resin, low crystallinity and high heat shrinkage can be achieved. In addition, the stretchability in film formation can be enhanced.

Examples of the cyclic olefin resin includes (a) copolymers of ethylene or propylene and cyclic olefins (e.g., norbornene and derivatives thereof, tetra cyclododecene and derivatives thereof), (b) ring-opening polymers of the cyclic olefins or copolymers of the cyclic olefins and α-olefins, (c) hydrogenated products of the polymers (b), and (d) graft-modified products of (a) to (c) with unsaturated carboxylic acids and derivatives thereof.

Commercially available examples of the cyclic olefin resin include ZEONOR (Zeon Corporation), APEL (Mitsui Chemicals, Inc.), and TOPAS (Polyplastics Co., Ltd.).

The cyclic olefin is not limited. Specific examples thereof include norbornene, 6-methylnorbornene, 6-ethylnorbornene, 5-propylnorbornene, 6-n-butylnorbornene, 1-methylnorbornene, 7-methylnorbornene, 5,6-dimethylnorbornene, 5-phenylnorbornene, and 5-benzylnorbornene.

Examples of the tetracyclododecene and derivatives thereof include 8-methyltetracyclo-3-dodecene, 8-ethyltetracyclo-3-dodecene, and 5,10-dimethyltetracyclo-3-dodecene.

The lower limit of the amount of the cyclic olefin resin in each of the front and back layers is 60% by weight, and the upper limit thereof is 80% by weight.

When the amount of the cyclic olefin resin is equal to or more than the lower limit and equal to or less than the upper limit, the heat shrinkable multilayer film can have good handleability and good transparency.

The lower limit of the amount of the cyclic olefin resin is preferably 65% by weight and the upper limit thereof is preferably 75% by weight.

The cyclic olefin resin preferably has a number average molecular weight of 1,000 to 1,000,000 as measured by gel permeation chromatography (GPC). When the number average molecular weight is within the above range, the film is easily produced.

The cyclic olefin resin preferably has a glass transition temperature of 20° C. to 130° C., more preferably 50° C. to 100° C. When the glass transition temperature is 20° C. or higher, the film surface can have good heat resistance, which suppresses blocking between containers on the attachment line. In addition, natural shrinkage can be within a favorable range. When the glass transition temperature is 130° C. or lower, the heat shrinkage in the transverse direction can be sufficiently large.

The cyclic olefin resin preferably has a density of 1,000 to 1,050 kg/m$^3$, more preferably 1,010 to 1,040 kg/m$^3$.

The cyclic olefin resin preferably has a melt flow rate (MFR) at 230° C. of 1 to 10 g/min.

The front and back layers each preferably further contain an ethylene resin.

The cyclic olefin resin contained in the front and back layers is susceptible to fatty acid esters, including sebum. If a human hand touches the heat shrinkable multilayer film before the film is attached to a container and shrunk, the portion where the fingerprints of the hand have been left may whiten after the film is shrunk. The front and back layers may contain the ethylene resin to remedy this. The front and back layers containing the ethylene resin can impart excellent grease resistance to the film.

The lower limit of the amount of the ethylene resin in the front and back layers is 20% by weight and the upper limit thereof is 40% by weight.

When the amount of the ethylene resin is equal to or more than the lower limit and equal to or less than the upper limit, the heat shrinkage of the resulting heat shrinkable multilayer film can be sufficiently increased.

The lower limit of the amount of the ethylene resin is preferably 25% by weight and the upper limit thereof is preferably 35% by weight.

The ethylene resin preferably has a density of 880 to 940 kg/m$^3$ and an MFR at 190° C. of 0.1 to 30 g/10 min. This improves the compatibility of the ethylene resin with the cyclic olefin resin, thus minimizing a decrease in transparency.

The ethylene resin preferably has a Vicat softening temperature of 90° C. to 110° C. The Vicat softening temperature can be measured by a method in conformity with JISK-7206 (1999).

The ethylene resin preferably has a melting point of 100° C. to 120° C.

Examples of the ethylene resin include branched low-density polyethylenes, linear low-density polyethylenes, ethylene-vinyl acetate copolymers, ionomer resins, and mixtures thereof. In particular, branched low-density polyethylenes and linear low-density polyethylenes are preferred.

The linear low-density polyethylene is a copolymer of ethylene and an α-olefin. Examples of the α-olefin include 1-butene, 1-pentene, 1-hexene, 4-methyl-1-pentene, and 1-octene.

Preferred linear low-density polyethylenes are those having a density of 880 to 940 kg/m$^3$ and an MFR at 190° C. of 0.1 to 30 g/10 min.

Commercially available examples of the linear low-density polyethylene include Evolue SP1520 (Prime Polymer Co., Ltd.), UMERIT 1520F (Ube-Maruzen Polyethylene), and SUMIKATHENE EFV402 (Sumitomo Chemical Co., Ltd.).

The front and back layers each may further contain organic fine particles.

Examples of the organic fine particles include organic fine particles such as acrylic resin fine particles, styrene resin fine particles, styrene-acrylic resin fine particles, urethane resin fine particles, and silicone resin fine particles. These may or may not be crosslinked, but preferably crosslinked so that the fine particles can have higher heat resistance. From the standpoint of the compatibility with the cyclic olefin resin, acrylic resin fine particles are preferred, and methyl polymethacrylate crosslinked fine particles are more preferred.

Commercially available examples of the organic fine particles include Techpolymer (Sekisui Plastics Co., Ltd.), FINE SPHERE (Nippon Paint Co., Ltd.), GANZPEARL (Aica Kogyo Company, Limited), and Art Pearl (Negami Chemical Industrial Co., Ltd.).

The lower limit of the average particle size of the organic fine particles is preferably 0.1 μm and the upper limit thereof is preferably 20 μm. The organic fine particles having an average particle size of smaller than 0.1 μm may not provide a film blocking preventing function. Also the organic fine particles having an average particle size of greater than 20 μm may not provide a film blocking preventing function. The lower limit is more preferably 0.5 μm and the upper limit is more preferably 10 μm. The lower limit is still more preferably 1 μm and the upper limit is still more preferably 5 μm. In the present invention, fine organic particles having different average particle sizes may be used in combination. The average particle size of the organic fine particles can be measured by a known laser diffraction/scattering method.

The lower limit of the amount of the organic fine particles is preferably 0.01% by weight and the upper limit thereof is preferably 0.3% by weight.

When the amount is less than 0.01% by weight, the film has a poor coefficient of dynamic friction. When the amount is more than 0.3% by weight, the film has poor transparency. The lower limit is more preferably 0.03% by weight and the upper limit is more preferably 0.2% by weight.

The interlayer contains an olefin resin.

When the interlayer contains the olefin resin, the heat shrinkable multilayer film can have low density.

Examples of the olefin resin include homopolymers of olefins, copolymers of olefins, and mixed resins thereof. Specific examples thereof include ethylene resins and propylene resins.

Examples of the ethylene resin include branched low-density polyethylene resins, linear low-density polyethylene resins, ethylene-vinyl acetate copolymers, ionomer resins, and mixtures thereof. Examples also include copolymers of ethylene and α-olefins.

Examples of the α-olefin include 1-butene, 1-pentene, 1-hexene, 4-methyl-1-pentene, and 1-octene.

The copolymers may be random or block copolymers.

In particular, ethylene-butene copolymers are preferred.

Commercially available examples of the ethylene resin include NEO-ZEX 2012F (Prime Polymer Co., Ltd.) and NOVATEC UF240 (Japan Polyethylene Corporation).

The ethylene resin preferably has a density of 880 to 950 kg/m$^3$.

The ethylene resin preferably has an MFR at 190° C. of 0.1 to 10 g/10 min.

The ethylene resin preferably has a melting point of 110° C. to 130° C.

The ethylene resin preferably has a Vicat softening temperature of 90° C. to 120° C.

From the standpoint of exhibiting heat shrinkability, the propylene resin is preferably a bipolymer or terpolymer containing propylene as a main component and an α-olefin as a copolymerization component. The copolymers may be random or block copolymers.

Specifically, the α-olefin preferably contains ethylene, 1-butene, 1-hexene, 1-octene, or the like, and may contain two or more α-olefins. The ratio of the α-olefin as a copolymerization component is preferably 1 to 10 mol %.

The propylene resin may be a mixture of different propylene-α-olefin copolymers.

In particular, propylene-ethylene-butene terpolymers, propylene-ethylene bipolymers, and propylene-butene bipolymers are preferred.

Commercially available examples of the propylene resin include Adsyl 5C30F (Basell), NOVATEC FX4G (Japan Polypropylene Corporation), and Polypropylene PC540R (SunAllomer Ltd.).

The propylene resin preferably has a density of 880 to 950 kg/m$^3$.

The propylene resin preferably has an MFR at 190° C. of 0.1 to 10 g/10 min.

The propylene resin preferably has a melting point of 120° C. to 140° C.

The propylene resin preferably has a Vicat softening temperature of 110° C. to 130° C.

The olefin resin includes olefin elastomer resins.

Preferred olefin elastomer resins are ethylene/α-olefin copolymer elastomers and propylene/α-olefin copolymer elastomers. The copolymers may be random or block copolymers.

The ethylene/α-olefin copolymer elastomer and the propylene/α-olefin copolymer elastomer are elastomers containing, as a copolymerization component, 15 mol % or more of an α-olefin having a carbon number of 4 or greater. Examples of the α-olefin include butene-1, pentene-1, hexene-1, octene-1, and 4-methylpentene-1.

In particular, ethylene/butene copolymer elastomers and propylene/butene copolymer elastomers are preferred.

Commercially available examples of the olefin elastomer resin include TAFMER A4085S (Mitsui Chemicals, Inc.) and TAFMER XM7070 (Mitsui Chemicals, Inc.).

The ethylene/butene copolymer elastomer preferably contains 70 to 90 mol % of an ethylene component and 10 to 30 mol % of a butene component.

The propylene/butene copolymer elastomer preferably contains 65 to 85 mol % of a propylene component and 15 to 35 mol % of a butene component.

With these structures, the elastomers can impart high shrinkability to the heat shrinkable multilayer film. In addition, the resulting film can exhibit excellent retention of elongation at low temperature.

The olefin elastomer resin preferably has a density of 850 to 950 kg/m$^3$.

The olefin elastomer resin preferably has an MFR at 190° C. of 2 to 8 g/10 min.

The olefin elastomer resin preferably has an MFR at 230° C. of 3 to 10 g/10 min.

The olefin elastomer resin preferably has a melting point of 60° C. to 80° C.

The olefin elastomer resin preferably has a Vicat softening temperature of 50° C. to 75° C.

The olefin resin constituting the interlayer may be a single resin or a mixed resin combining multiple resins.

The interlayer contains the olefin resin in an amount of 50 to 80% by weight.

When the amount of the olefin resin in the interlayer is 50% by weight or more, the heat shrinkable multilayer film can have low density. In addition, high shrinkability can be imparted to the film. When the amount of the olefin resin is 80% by weight or less, a heat shrinkable multilayer film with high rigidity can be obtained.

The amount of the olefin resin is preferably 55 to 75% by weight, more preferably 60 to 70% by weight.

The interlayer contains a plastic resin.

The plastic resin herein means a resin having plasticity other than the olefin resin.

Examples of the plastic resin include petroleum resins, terpene resins, rosin resins, and hydrogenated derivatives thereof.

Examples of the petroleum resin include alicyclic petroleum resins from cyclopentadiene or a dimer thereof, and aromatic petroleum resins from the C9 fraction.

Naphtha is cracked to produce useful compounds (e.g., ethylene, propylene, butadiene). The petroleum resin herein refers to a resin obtained by polymerizing, in a mixed state, the C4 to C5 fractions (mainly C5 fraction) or C5 to C9 fractions (mainly C9 fraction) remaining after recovery of the useful compounds. Although the properties of the resin to be formed varies depending on the compositional ratio of the olefin fraction as the raw material, the petroleum resin is a clear, pale-yellow or yellowish-brown, pine resin-like resin having a molecular weight of 200 to 2,000 and a softening point of 5° C. to 160° C.

Examples of the terpene resin include terpene resins from β-pinene and terpene-phenol resins.

Terpene resin is a resin produced from a family of natural products that are known to be components of plant essential oils and have a chemical structure based on a C5 isoprene unit. They are compounds biosynthesized via the mevalonate pathway, and have isopentenyl pyrophosphate bonded in a head-to-tail fashion. On the basis of the number of isoprene units, they are classified into hemiterpenes ($C_5$), monoterpenes ($C_{10}$), sesquiterpenes ($C_{15}$), diterpenes ($C_{20}$), triterpenes ($C_{30}$), and the like.

Examples of the rosin resin include rosin resins such as gum rosin and wood rosin and esterified rosin resins modified with glycerin or pentaerythritol.

Rosin resin is a non-volatile component of pine resin contained in a large amount in Pinaceae. Typically, rosin resin is produced mainly from various isomers called resin acids.

Examples of the resin acid include resin acids having a conjugated double bond such as abietic acid, neoabietic acid, and palustric acid, pimaric acid, isopimaric acid, and dehydroabietic acid.

Commercially available examples of the plastic resin include ARKON (Arakawa Chemical Industries Ltd.), CLEARON (Yasuhara Chemical Co., Ltd.), and I-MARV (Idemitsu Kosan Co., Ltd.).

The plastic resin preferably has a softening temperature of 100° C. to 150° C., more preferably 110° C. to 140° C. When the softening temperature of the plastic resin is within this range, the heat shrinkable multilayer film can exhibit good heat shrinkability.

The plastic resin preferably has a density of 950 to 1,050 kg/m$^3$, more preferably 980 to 1,020 kg/m$^3$.

When the density of the plastic resin is within the above range, a film with high rigidity can be obtained.

The plastic resin preferably has a number average molecular weight of 500 to 1,000, more preferably 600 to 900.

When the number average molecular weight is within the above range, a film with high rigidity can be obtained.

The plastic resin preferably has a refractive index at 20° C. of 1.0 to 2.0, more preferably 1.2 to 1.8.

When the refractive index is within the above range, a film having good transparency can be obtained.

The interlayer contains the plastic resin in an amount of 20 to 50% by weight.

When the amount of the plastic resin in the interlayer is 20% by weight or more, high shrinkability can be imparted to the heat shrinkable multilayer film, and the film can also have high rigidity. When the amount of the plastic resin is 50% by weight or less, a decrease in elongation at low temperature and delamination can be suppressed. In addition, the heat shrinkable multilayer film can have low density.

The amount of the plastic resin is preferably 25 to 45% by weight, more preferably 30 to 40% by weight.

The interlayer is constituted of a resin containing 35 to 70 mol % of a propylene component, 1 to 10 mol % of an ethylene component, and 1 to 10 mol % of a butene component, based on 100 mol % of the total of the resin components constituting the interlayer.

When the above components are contained within the above ranges, the heat shrinkable multilayer film of the present invention can exhibit sufficient shrinkability. In addition, the film can have high rigidity.

The lower limit of the amount of the propylene component in the resin constituting the interlayer is 35 mol % and the upper limit thereof is 70 mol %.

When the amount of the propylene component is within the above range, high rigidity and high shrinkability can be imparted to the heat shrinkable multilayer film.

The lower limit of the amount of the propylene component is preferably 40 mol %, more preferably 50 mol %. The upper limit thereof is preferably 60 mol %, more preferably 55 mol %.

The lower limit of the amount of the ethylene component in the resin constituting the interlayer is 1 mol % and the upper limit thereof is 10 mol %.

The amount of the ethylene component within the above range leads to suppressed delamination and improved transparency of the heat shrinkable multilayer film.

The lower limit of the amount of the ethylene component is preferably 1.5 mol %, more preferably 2.0 mol %. The upper limit thereof is preferably 5.0 mol %, more preferably 4.0 mol %.

The lower limit of the amount of the butene component in the resin constituting the interlayer is 1 mol % and the upper limit thereof is 10 mol %.

When the amount of the butene component is within the above range, high shrinkability can be imparted to the heat shrinkable multilayer film, and the film can have improved transparency.

The lower limit of the amount of the butene component is preferably 2.0 mol %, more preferably 4.0 mol %. The upper limit thereof is preferably 8.0 mol %, more preferably 6.0 mol %.

The lower limit of the total amount of the propylene component, ethylene component, and butene component in the resin constituting the interlayer is preferably 50 mol % and the upper limit thereof is preferably 80 mol %.

When the total amount is within the above range, the heat shrinkable multilayer film can have low density. In addition, high shrinkability and high transparency can be imparted to the film.

The lower limit of the total amount is more preferably 55 mol % and the upper limit thereof is more preferably 75 mol %.

The propylene component, the ethylene component, and the butene component means a component derived from propylene, a component derived from ethylene, and a component derived from butene, respectively, in the resin constituting the interlayer.

The resin constituting the interlayer may contain component(s) other than the propylene component, ethylene component, and butene component.

The total amount of the propylene component, ethylene component, butene component, and other component(s) in the resin constituting the interlayer is 100 mol %.

The amounts of the propylene component, ethylene component, and butene component in the resin constituting the interlayer can be determined by, for example, measuring the amounts of the propylene component, ethylene component, and butene component in each raw material resin for constituting the interlayer by NMR (nuclear magnetic resonance method), and calculating the amount of each component in the resin constituting the interlayer based on the measured amount of each component and the mixing ratio of each raw material resin in the interlayer.

For example, in the case where the resin constituting the interlayer is a single resin, the amounts of the propylene component, ethylene component, and butene component in the interlayer can be measured by NMR.

In the case where the resin constituting the interlayer is a mixed resin combining multiple resins, the proportions of the propylene component, ethylene component, and butene component in the interlayer can be determined by measuring the amounts of the propylene component, ethylene component, and butene component in each raw material resin for constituting the interlayer by NMR, and calculating the proportions based on the mixing ratio of each raw material resin in the interlayer.

Either in the case where the resin constituting the interlayer is a single resin or in the case where the resin is a mixed resin combining multiple resins, the amounts of the propylene component, ethylene component, and butene component in the resin constituting the interlayer may be measured by NMR.

The front and back layers and the interlayer may contain additives such as antioxidants, thermal stabilizers, ultraviolet absorbers, light stabilizers, lubricants, antistatic agents, flame retardants, antibacterial agents, fluorescent brighteners, and colorants, if necessary.

The lower limit of the total thickness of the heat shrinkable multilayer film of the present invention is preferably 20 μm and the upper limit thereof is preferably 80 μm. The lower limit is more preferably 25 μm and the upper limit is more preferably 70 μm. When the total thickness of the heat shrinkable multilayer film is within the above range, the heat shrinkable multilayer film can be excellent in heat shrinkability, converting properties (e.g., printing properties, center sealing properties), and attachability.

In the heat shrinkable multilayer film of the present invention, the lower limit of the thickness of the interlayer relative to the total thickness of the heat shrinkable multilayer film is preferably 50%, and the upper limit thereof is preferably 90%. When the thickness of the interlayer is within the above range, the heat shrinkable multilayer film can have high interlaminar strength and high transparency.

The lower limit of the coefficient of dynamic friction of the heat shrinkable multilayer film of the present invention is preferably 0.3 and the upper limit thereof is preferably 0.55. The lower limit is more preferably 0.4 and the upper limit is more preferably 0.5. When the coefficient of dynamic friction is within the above range, defects such as blocking can be prevented. In addition, the resulting heat shrinkable multilayer film can have improved handleability.

The heat shrinkable multilayer film of the present invention preferably has a density of less than 1,000 kg/m$^3$.

When the density is less than 1,000 kg/m$^3$, the heat shrinkable label and a container can be easily separated with a gravity separator in recycling a container having the heat shrinkable label attached thereto.

The density is more preferably less than 980 kg/m$^3$, still more preferably less than 960 kg/m$^3$.

The lower limit of the heat shrinkage in the main shrinkage direction (TD) after immersing the heat shrinkable multilayer film of the present invention in 90° C. hot water for 10 seconds is preferably 60%. When the heat shrinkage is 60% of higher, the heat shrinkable multilayer film causes no shrinkage defects such as creases or distortion, and thus can be suitably used as a heat shrinkable multilayer film.

The lower limit of the heat shrinkage is more preferably 62% and the upper limit thereof is preferably 70%.

The lower limit of the tensile elongation at break of the heat shrinkable multilayer film of the present invention in the direction (MD) perpendicular to the main shrinkage direction under an atmosphere at 5° C. is preferably 100%.

When the tensile elongation at break is 100% or higher, the film is less likely to break in such processes as printing and sealing, leading to improved production efficiency.

The lower limit of the tensile elongation at break is more preferably 200% and the upper limit thereof is preferably 400%.

The natural shrinkage of the heat shrinkable multilayer film of the present invention in the main shrinkage direction (TD) after standing under an atmosphere at 40° C. for seven days is preferably less than 3.0%.

When the natural shrinkage is less than 3.0%, the heat shrinkable multilayer film exhibits lower shrinkage in storage and causes no problems such as shrinkage defects, so that it can be suitably used as a heat shrinkable multilayer film.

The natural shrinkage is more preferably less than 2.8%.

The lower limit of the delamination strength of the heat shrinkable multilayer film of the present invention is preferably 0.4 N/10 mm.

When the delamination strength is 0.4 N/10 mm or higher, the delamination between the front and back layers and the interlayer is less likely to occur in printing and sealing processes or in attaching the label, so that the heat shrinkable multilayer film can be suitably used as a heat shrinkable label.

The heat shrinkable multilayer film of the present invention may be produced by any method, and preferably produced by simultaneously forming all the layers by a co-extruding method. In the case of co-extrusion using a T-die, the layers may be stacked by a feed block technique, a multi-manifold technique, or a combination thereof.

Specifically, for example, the heat shrinkable multilayer film of the present invention can be produced by individually putting materials for the front and back layers and if necessary materials for the interlayer in an extruder; extruding the materials into a sheet through a die; cooling and solidifying the sheet with take-up rolls; and uniaxially or biaxially stretching the sheet.

The stretching can be performed by, for example, a roll stretching method, a tenter stretching method, or a combination thereof. The stretching temperature depends on factors such as the softening temperature of the resins constituting the film and required shrinkage properties of the heat shrinkable multilayer film. The lower limit of the stretching temperature is preferably 65° C., and the upper limit thereof is preferably 120° C. The lower limit is more preferably 70° C., and the upper limit is more preferably 115° C. The stretch ratio in the main shrinkage direction depends on factors such as the resins constituting the film, the method of stretching the film, and the stretching temperature. The ratio is preferably three times or more, more preferably four times or more, whereas preferably seven times or less, more preferably six times or less. A stretching temperature and a stretch ratio within such ranges lead to excellent thickness accuracy.

The usage of the heat shrinkable multilayer film of the present invention is not limited. Since the heat shrinkable multilayer film of the present invention is readily torn along perforations and has excellent drop impact resistance and excellent transparency, the heat shrinkable multilayer film is suitable for use as a base film for a heat shrinkable label to be attached to a container such as a plastic bottle and a metal can.

Advantageous Effects of Invention

The present invention provides a heat shrinkable multilayer film that has low density, excellent shrinkage properties, and high rigidity, is less likely to suffer delamination, and also has excellent transparency.

DESCRIPTION OF EMBODIMENTS

Embodiments of the present inventions are described below in detail with reference to examples. The present invention is not limited to the examples.

Examples 1 to 15 and Comparative Examples 1 to 10

As raw material resins for front and back layers and an interlayer, resins listed in Table 1 were mixed according to the proportions shown in Tables 2 and 3. Thus, mixed resins for front and back layers and an interlayer were obtained.

The mixed resins for a front layer, an interlayer, and a back layer were melted in different extruders. The mixed resins for a front layer and a back layer were melted at a barrel temperature of 210° C. and the mixed resin for an interlayer was melted at a barrel temperature of 180° C. The melted resins were extruded from a T-die and cooled and solidified on cooled rolls at 30° C. to prepare an unstretched sheet. This sheet was stretched with a tenter stretching machine at 90° C. to five times in the TD to produce a film which had a total thickness of 50 μm and in which the front layer, the interlayer, and the back layer had thicknesses of 8.35 μm, 33.3 μm, and 8.35 μm, respectively.

The amounts of a propylene component, an ethylene component, and a butene component in the resin for the interlayer were measured by a nuclear magnetic resonance method (NMR).

(Evaluation)

The heat shrinkable multilayer films obtained in the examples and comparative examples were evaluated for the following parameters. Tables 2 and 3 show the results.

(1) Density

The films obtained in the examples and comparative examples were cut into samples (size: MD 100 mm×TD 100 mm) to give specimens. The density of each obtained specimen was measured with a densimeter (Alfa Mirage Co., Ltd., Electronic Densimeter MD-300S) using an ethanol solvent. The densities of ten specimens were measured for each of the films obtained in the examples and comparative examples. The average of the measurements was calculated and evaluated in accordance with the criteria below.
○ (Good): a density of lower than 1,000 kg/m$^3$
x (Poor): a density of 1,000 kg/m$^3$ or higher (2) Heat shrinkage The films obtained in the examples and comparative examples were cut into samples (size: MD 100 mm×TD 100 mm) to give specimens. Each obtained specimen was immersed into 90° C. hot water for 10 seconds. Then, the heat shrinkable multilayer film was taken out and immersed in 15° C. water for five seconds. The heat shrinkage in the TD was determined by the formula below. For heat shrinkage, three specimens were measured for each of the examples and comparative examples and the average of the measurements was calculated.

Heat shrinkage (%)={(100−$L$)/100}×100 ($L$ represents the length in the TD after shrinking)

The obtained heat shrinkage was evaluated in accordance with the criteria below.
○ (Good): 60% or higher
x (Poor): lower than 60%

(3) Young's Modulus

The films obtained in the examples and comparative examples were cut into samples (size: MD 250 mm×TD 5 mm) to give specimens. Each obtained specimen was measured using Strograph VE-1D (Toyo Seiki Seisakusho, Ltd.) by a method in conformity with ASTMD882. For Young's modulus, seven specimens were measured for each of the examples and comparative examples and the average of the measurements was calculated. The obtained Young's modulus was evaluated in accordance with the criteria below.

○ (Good): 1.5 GPa or higher in the MD and 2.0 GPa or higher in the TD
x (Poor): lower than 1.5 GPa in the MD or lower than 2.0 GPa in the TD (4) Natural Shrinkage The films obtained in the examples and comparative examples were cut into specimens (size: MD 100 mm×TD 100 mm). Each obtained specimen was allowed to stand in a thermostat (Yamato Scientific Co., Ltd., IL-82) at an interior temperature of 40° C. for seven days. Then, the dimensional change in the TD was measured. For natural shrinkage, two specimens were measured for each of the examples and comparative examples and the average of the measurements was calculated. The obtained natural shrinkage was evaluated in accordance with the criteria below.
○ (Good): lower than 3.0%
x (Poor): 3.0% or higher (5) Tensile Elongation at Break The films obtained in the examples and comparative examples were cut into specimens (gauge length: 40 mm, width: 10 mm). Each obtained specimen was measured using Strograph VE-1D (Toyo Seiki Seisakusho, Ltd.) by a method in conformity with JISK-6732. The measurement atmosphere temperature was 5° C., and the test rate was 100 mm/min. For tensile elongation at break, five specimens were measured for each of the examples and comparative examples and the average of the measurements was calculated. The obtained tensile elongation at break was evaluated in accordance with the criteria below.
○ (Good): 100% or higher
x (Poor): The specimen was broken at lower than 100%.

(6) Haze

The films obtained in the examples and comparative examples were cut into specimens (size: 50 mm×100 mm). Each obtained specimen was measured using a haze meter (Nippon Denshoku Industries Co., Ltd., NDH5000) by a method in conformity with JISK-7136. For haze, four specimens were measured for each of the examples and comparative examples and the average of the measurements was calculated. The obtained haze was evaluated in accordance with the criteria below.
○ (Good): lower than 7.0%
x (Poor): 7.0% or higher (7) Delamination Strength The films obtained in the examples and comparative examples were cut into strips (width: 10 mm). Each obtained specimen was measured with an adhesion and peeling resistance tester (Shinto Scientific Co., Ltd., HEIDON TYPE 17) for delamination strength between the front or back layer and the interlayer of the film. For delamination strength, four specimens were measured for each of the examples and comparative examples, and the average of the measurements was calculated. The obtained delamination strength was evaluated in accordance with the criteria below.
○ (Good): 0.4 N/cm or higher
x (Poor): lower than 0.4 N/cm

TABLE 1

| | | | Density | MFR (g/10 min) | | Melting point | Glass transition temperature | Vicat softening temperature |
|---|---|---|---|---|---|---|---|---|
| | | Composition | (kg/m$^3$) | 190° C. | 230° C. | (° C.) | (° C.) | (° C.) |
| Front and back layers | COC1 | Cyclic olefin resin (Ethylene-norbornene copolymer) | 1010 | — | 5.5 | — | 65 | — |
| | LL1 | Ethylene resin (C6 linear low-density polyethylene) | 913 | 2.0 | — | 113 | — | 96 |

TABLE 1-continued

| | | Composition | Density (kg/m³) | MFR (g/10 min) 190° C. | MFR (g/10 min) 230° C. | Melting point (° C.) | Glass transition temperature (° C.) | Vicat softening temperature (° C.) |
|---|---|---|---|---|---|---|---|---|
| Interlayer | PP1 | Propylene resin (propylene-ethylene-butene random terpolymer, propylene: 91 mol %, ethylene: 3 mol %, butene: 6 mol %) | 921 | — | 5.5 | 130 | — | 115 |
| | PP2 | Propylene resin (propylene-ethylene random bipolymer, propylene: 93 mol %, ethylene: 7 mol %) | 900 | — | 5.0 | 132 | — | 120 |
| | HC1 | Plastic resin (alicyclic hydrogenated petroleum resin, number average molecular weight 750, refractive index 1.535 (20° C.)) | 999 | — | — | — | — | 125* |
| | TPE1 | Olefin elastomer resin (propylene-butene random bipolymer, propylene: 74 mol %, butene: 26 mol %) | 900 | 3.0 | 7.0 | 75 | — | 67 |
| | TPE2 | Olefin elastomer resin (ethylene-butene random bipolymer, ethylene: 82 mol %, butene: 18 mol %) | 885 | 3.6 | 6.7 | 72 | — | 55 |

*softening temperature (° C.)

TABLE 2

| | | | Example 1 | Example 2 | Example 3 | Example 4 | Example 5 | Example 6 | Example 7 | Example 8 |
|---|---|---|---|---|---|---|---|---|---|---|
| Constitutional resin (% by weight) | Front and back layers | C0C1 | 70 | 70 | 70 | 70 | 70 | 70 | 70 | 70 |
| | | LL1 | 30 | 30 | 30 | 30 | 30 | 30 | 30 | 30 |
| | Interlayer | PP1 | 65 | 58 | 50 | 30 | 55 | 59 | 58 | 46 |
| | | PP2 | — | — | — | — | — | — | — | — |
| | | HC1 | 20 | 32 | 44 | 50 | 35 | 35 | 40 | 45 |
| | | TPE1 | 15 | 10 | 6 | 10 | — | — | — | 9 |
| | | TPE2 | — | — | — | 10 | 10 | 6 | 2 | — |
| Interlayer composition (mol %) | | Propylene component | 70 | 60 | 50 | 35 | 50 | 54 | 53 | 49 |
| | | Ethylene component | 2 | 2 | 2 | 9 | 10 | 6 | 3 | 1 |
| | | Butene component | 8 | 6 | 4 | 6 | 5 | 5 | 4 | 5 |
| Evaluation | Density | Measured value (kg/m³) | 930 | 938 | 951 | 970 | 944 | 948 | 951 | 955 |
| | | Evaluation | ○ | ○ | ○ | ○ | ○ | ○ | ○ | ○ |
| | Heat shrinkage | Measured value (%) | 60 | 61 | 63 | 65 | 60 | 60 | 61 | 64 |
| | | Evaluation | ○ | ○ | ○ | ○ | ○ | ○ | ○ | ○ |
| | Young's modulus | Measured value (GPa, MD) | 1.5 | 1.5 | 1.6 | 1.6 | 1.5 | 1.5 | 1.6 | 1.6 |
| | | Measured value (GPa, TD) | 2.0 | 2.0 | 2.1 | 2.1 | 2.0 | 2.0 | 2.1 | 2.1 |
| | | Evaluation | ○ | ○ | ○ | ○ | ○ | ○ | ○ | ○ |
| | Natural shrinkage | Measured value (%) | 2.8 | 2.7 | 2.6 | 2.6 | 2.8 | 2.7 | 2.6 | 2.5 |
| | | Evaluation | ○ | ○ | ○ | ○ | ○ | ○ | ○ | ○ |
| | Tensile elongation at break | Measured value (%) | 330 | 320 | 312 | 300 | 290 | 282 | 275 | 320 |
| | | Evaluation | ○ | ○ | ○ | ○ | ○ | ○ | ○ | ○ |
| | Haze | Measured value (%) | 6.5 | 6.3 | 6.1 | 6.2 | 6.0 | 5.8 | 5.6 | 6.2 |
| | | Evaluation | ○ | ○ | ○ | ○ | ○ | ○ | ○ | ○ |
| | Delamination strength | Measured value (N/cm) | 0.8 | 0.8 | 0.8 | 0.7 | 0.8 | 0.8 | 0.8 | 0.7 |
| | | Evaluation | ○ | ○ | ○ | ○ | ○ | ○ | ○ | ○ |

| | | | Example 9 | Example 10 | Example 11 | Example 12 | Example 13 | Example 14 | Example 15 |
|---|---|---|---|---|---|---|---|---|---|
| Constitutional resin (% by weight) | Front and back layers | C0C1 | 70 | 70 | 70 | 70 | 80 | 60 | 70 |
| | | LL1 | 30 | 30 | 30 | 30 | 20 | 40 | 30 |
| | Interlayer | PP1 | 49 | 50 | 30 | 20 | 54 | 54 | — |
| | | PP2 | — | — | 20 | 35 | — | — | 50 |
| | | HC1 | 26 | 35 | 45 | 45 | 40 | 40 | 40 |
| | | TPE1 | 25 | 15 | 5 | — | 6 | 6 | 10 |
| | | TPE2 | — | — | — | — | — | — | — |
| Interlayer composition (mol %) | | Propylene component | 63 | 56 | 50 | 51 | 53 | 53 | 54 |
| | | Ethylene component | 1 | 2 | 2 | 3 | 2 | 2 | 4 |
| Evaluation | | Butene component | 10 | 7 | 3 | 1 | 5 | 5 | 3 |
| | Density | Measured value (kg/m³) | 942 | 947 | 953 | 961 | 950 | 940 | 948 |
| | | Evaluation | ○ | ○ | ○ | ○ | ○ | ○ | ○ |
| | Heat shrinkage | Measured value (%) | 63 | 62 | 62 | 61 | 63 | 60 | 61 |
| | | Evaluation | ○ | ○ | ○ | ○ | ○ | ○ | ○ |
| | Young's modulus | Measured value (GPa, MD) | 1.5 | 1.6 | 1.6 | 1.7 | 1.6 | 1.5 | 1.5 |
| | | Measured value (GPa, TD) | 2.0 | 2.1 | 2.1 | 2.2 | 2.1 | 2.0 | 2.0 |
| | | Evaluation | ○ | ○ | ○ | ○ | ○ | ○ | ○ |
| | Natural shrinkage | Measured value (%) | 2.8 | 2.7 | 2.5 | 2.4 | 2.6 | 2.8 | 2.7 |
| | | Evaluation | ○ | ○ | ○ | ○ | ○ | ○ | ○ |

TABLE 2-continued

|  |  |  |  |  |  |  |  |  |
|---|---|---|---|---|---|---|---|---|
| Tensile elongation | Measured value (%) | 300 | 285 | 278 | 270 | 280 | 320 | 340 |
| at break | Evaluation | ○ | ○ | ○ | ○ | ○ | ○ | ○ |
| Haze | Measured value (%) | 6.0 | 5.9 | 5.7 | 5.6 | 5.2 | 6.5 | 6.5 |
|  | Evaluation | ○ | ○ | ○ | ○ | ○ | ○ | ○ |
| Delamination | Measured value (N/cm) | 0.8 | 0.8 | 0.7 | 0.7 | 0.6 | 0.8 | 0.7 |
| strength | Evaluation | ○ | ○ | ○ | ○ | ○ | ○ | ○ |

TABLE 3

|  |  |  | Comparative Example 1 | Comparative Example 2 | Comparative Example 3 | Comparative Example 4 | Comparative Example 5 |
|---|---|---|---|---|---|---|---|
| Constitutional resin (% by weight) | Front and back layers | COC1 | 70 | 70 | 70 | 70 | 70 |
|  |  | LL1 | 30 | 30 | 30 | 30 | 30 |
|  | Interlayer | PP1 | 78 | 25 | 60 | 10 | 40 |
|  |  | PP2 | — | — | — | — | — |
|  |  | HC1 | 22 | 60 | 29 | 61 | 28 |
|  |  | TPE1 | — | 15 | — | 29 | 32 |
|  |  | TPE2 | — | — | 11 | — | — |
| Interlayer composition (mol %) | Propylene component |  | 71 | 34 | 54 | 31 | 60 |
|  | Ethylene component |  | 2 | 1 | 11 | 0 | 1 |
|  | Butene component |  | 5 | 5 | 6 | 8 | 11 |
| Evaluation | Density | Measured value (kg/m³) | 939 | 1005 | 954 | 1010 | 941 |
|  |  | Evaluation | ○ | x | ○ | x | ○ |
|  | Heat shrinkage | Measured value (%) | 55 | 61 | 56 | 62 | 58 |
|  |  | Evaluation | x | ○ | x | ○ | x |
|  | Young's modulus | Measured value (GPa, MD) | 1.5 | 1.7 | 1.3 | 1.4 | 1.3 |
|  |  | Measured value (GPa, TD) | 2.0 | 2.2 | 1.7 | 1.8 | 1.7 |
|  |  | Evaluation | ○ | ○ | x | x | x |
|  | Natural shrinkage | Measured value (%) | 2.7 | 2.8 | 3.2 | 3.2 | 3.5 |
|  |  | Evaluation | ○ | ○ | x | x | x |
|  | Tensile elongation at break | Measured value (%) | 290 | 30 | 320 | 10 | 300 |
|  |  | Evaluation | ○ | x | ○ | x | ○ |
|  | Haze | Measured value (%) | 5.1 | 7.5 | 8.7 | 8.7 | 8.5 |
|  |  | Evaluation | ○ | x | x | x | x |
|  | Delamination strength | Measured value (N/cm) | 0.7 | 0.2 | 0.8 | 0.1 | 0.7 |
|  |  | Evaluation | ○ | x | ○ | x | ○ |

|  |  |  | Comparative Example 6 | Comparative Example 7 | Comparative Example 8 | Comparative Example 9 | Comparative Example 10 |
|---|---|---|---|---|---|---|---|
| Constitutional resin (% by weight) | Front and back layers | COC1 | 70 | 85 | 55 | 70 | 70 |
|  |  | LL1 | 30 | 15 | 45 | 30 | 30 |
|  | Interlayer | PP1 | — | 55 | 55 | 75 | 35 |
|  |  | PP2 | 60 | — | — | — | — |
|  |  | HC1 | 40 | 39 | 39 | 15 | 55 |
|  |  | TPE1 | — | 6 | 6 | — | 10 |
|  |  | TPE2 | — | — | — | 10 | — |
| Interlayer composition (mol %) | Propylene component |  | 56 | 54 | 54 | 68 | 39 |
|  | Ethylene component |  | 4 | 2 | 2 | 10 | 1 |
|  | Butene component |  | 0 | 5 | 5 | 6 | 5 |
| Evaluation | Density | Measured value (kg/m³) | 980 | 960 | 952 | 945 | 1020 |
|  |  | Evaluation | ○ | ○ | ○ | ○ | x |
|  | Heat shrinkage | Measured value (%) | 54 | 63 | 55 | 56 | 62 |
|  |  | Evaluation | x | ○ | x | x | ○ |
|  | Young's modulus | Measured value (GPa, MD) | 1.6 | 1.6 | 1.2 | 1.3 | 1.6 |
|  |  | Measured value (GPa, TD) | 2.1 | 2.1 | 1.7 | 1.7 | 2.1 |
|  |  | Evaluation | ○ | ○ | x | x | ○ |
|  | Natural shrinkage | Measured value (%) | 2.5 | 2.9 | 3.4 | 3.3 | 2.5 |
|  |  | Evaluation | ○ | ○ | x | x | ○ |
|  | Tensile elongation at break | Measured value (%) | 20 | 290 | 330 | 340 | 10 |
|  |  | Evaluation | x | ○ | ○ | ○ | x |
|  | Haze | Measured value (%) | 6.5 | 5.1 | 7.2 | 6.3 | 7.2 |
|  |  | Evaluation | ○ | ○ | x | ○ | x |
|  | Delamination strength | Measured value (N/cm) | 0.2 | 0.3 | 0.7 | 0.8 | 0.1 |
|  |  | Evaluation | x | x | ○ | ○ | x |

INDUSTRIAL APPLICABILITY

The present invention provides a heat shrinkable multilayer film that has low density, excellent shrinkage properties, and high rigidity, as well as excellent adhesiveness and transparency.

The invention claimed is:

1. A heat shrinkable multilayer film, comprising:
    front and back layers; and
    an interlayer,
    the front and back layers each containing 60 to 80% by weight of a cyclic olefin resin and 20 to 40% by weight of an ethylene resin,
    the interlayer containing 50 to 80% by weight of an olefin resin and 20 to 50% by weight of a plastic resin, the interlayer containing 35 to 70 mol % of a propylene component, 1 to 10 mol % of an ethylene component, and 1 to 10 mol % of a butene component, based on 100 mol % of resin components constituting the interlayer, and
    the plastic resin being a petroleum resin, a terpene resin, a rosin resin, or a hydrogenated derivative thereof, the plastic resin not being an olefin resin.

2. The heat shrinkable multilayer film according to claim 1, wherein the ethylene resin constituting the front and back layers is a linear low-density polyethylene.

3. The heat shrinkable multilayer film according to claim 1, having a density of lower than 1,000 kg/m$^3$.

4. A heat shrinkable label comprising:
    the heat shrinkable multilayer film according to claim 1.

* * * * *